(12) United States Patent
Haraguchi et al.

(10) Patent No.: US 8,879,638 B2
(45) Date of Patent: Nov. 4, 2014

(54) IMAGE CODING APPARATUS AND IMAGE CONVERSION APPARATUS

(75) Inventors: Yuki Haraguchi, Osaka (JP); Makoto Saitoh, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 514 days.

(21) Appl. No.: 12/965,242

(22) Filed: Dec. 10, 2010

(65) Prior Publication Data

US 2011/0158325 A1 Jun. 30, 2011

(30) Foreign Application Priority Data

Dec. 24, 2009 (JP) ................................ 2009-293040

(51) Int. Cl.

| | |
|---|---|
| H04B 1/66 | (2006.01) |
| H04N 7/12 | (2006.01) |
| H04N 11/02 | (2006.01) |
| H04N 11/04 | (2006.01) |
| G06K 9/36 | (2006.01) |
| G06K 9/46 | (2006.01) |
| G06K 9/00 | (2006.01) |
| H04N 19/61 | (2014.01) |
| H04N 19/14 | (2014.01) |
| H04N 19/124 | (2014.01) |
| H04N 19/176 | (2014.01) |

(52) U.S. Cl.
CPC ... *H04N 19/00157* (2013.01); *H04N 19/00781* (2013.01); *H04N 19/0009* (2013.01); *H04N 19/00278* (2013.01)

USPC ............ 375/240.24; 375/240.16; 375/240.05; 375/240.03; 382/236; 382/239; 382/251

(58) Field of Classification Search
USPC ............. 375/240.24, 240.16, 240.05, 240.03; 382/236, 239, 251
See application file for complete search history.

(56) References Cited

U.S. PATENT DOCUMENTS

| | | | |
|---|---|---|---|
| 5,561,719 A | 10/1996 | Sugahara et al. | |
| 6,542,643 B1 * | 4/2003 | Pau et al. ...................... | 382/236 |
| 6,614,941 B1 | 9/2003 | Stone et al. | |

(Continued)

FOREIGN PATENT DOCUMENTS

| | | |
|---|---|---|
| JP | 5-64016 A | 3/1993 |
| JP | 5-137132 A | 6/1993 |

(Continued)

*Primary Examiner* — Joseph Ustaris
*Assistant Examiner* — Farhan Mahmud
(74) *Attorney, Agent, or Firm* — Oblon, Spivak, McClelland, Maier & Neustadt, L.L.P.

(57) ABSTRACT

A statistical value calculation part specifies macroblocks positioned around an object macroblock and calculates a minimum average value of activities of the macroblocks. When images of the macroblocks are flat and the minimum average value is smaller than an activity of the object macroblock, the minimum average value is set as an adjustment value. A correction factor determination part determines a correction factor on the basis of the adjustment value and a factor determination table. By multiplying a reference quantization step value by the correction factor, a quantization step value of the object macroblock is determined. Since the quantization step value reflects a distribution of the activities of the macroblocks, it is possible to suppress a local change of the quantization step value.

13 Claims, 6 Drawing Sheets

(56) References Cited

U.S. PATENT DOCUMENTS

| | | |
|---|---|---|
| 2005/0063469 A1 | 3/2005 | Furukawa et al. |
| 2005/0105815 A1* | 5/2005 | Zhang et al. ............... 382/251 |
| 2005/0286786 A1* | 12/2005 | Noda ............................ 382/239 |
| 2006/0062293 A1* | 3/2006 | Kaye et al. ............... 375/240.03 |
| 2006/0104349 A1* | 5/2006 | Joch et al. ............... 375/240.03 |
| 2007/0201553 A1* | 8/2007 | Shindo ..................... 375/240.03 |
| 2007/0297508 A1* | 12/2007 | Kobayashi ............... 375/240.05 |
| 2008/0031337 A1 | 2/2008 | Hasegawa et al. |

FOREIGN PATENT DOCUMENTS

| | | |
|---|---|---|
| JP | 5-227525 A | 9/1993 |
| JP | 6-54320 A | 2/1994 |
| JP | 6-245199 A | 9/1994 |
| JP | 9-163371 A | 6/1997 |
| JP | 10-285589 A | 10/1998 |
| JP | 2001-148852 A | 5/2001 |
| JP | 2002-51345 A | 2/2002 |
| JP | 2008-5071 A | 1/2008 |
| JP | 2008-42426 | 2/2008 |

* cited by examiner

FIG. 4

| RANK | MACROBLOCK | ACTIVITY |
|---|---|---|
| 1 | MB2 | 1107(ACT2) |
| 2 | MB3 | 1074(ACT3) |
| 3 | MB8 | 1051(ACT8) |
| 4 | MB6 | 1013(ACT6) |
| 5 | MB1 | 1009(ACT1) |
| 6 | MB5 | 966(ACT5) |
| 7 | MB4 | 923(ACT4) |
| 8 | MB7 | 911(ACT7) |

MAXIMUM AVERAGE VALUE 1061.25 (ranks 1-4)

MINIMUM AVERAGE VALUE 952.25 (ranks 5-8)

FIG. 5

| RANK | MACROBLOCK | ACTIVITY |
|---|---|---|
| 1 | MB2 | 1107(ACT2) |
| 2 | MB3 | 1074(ACT3) |
| 3 | MB8 | 1051(ACT8) |
| 4 | MB6 | 1013(ACT6) |
| 5 | MB1 | 1009(ACT1) |
| 6 | MB5 | 966(ACT5) |
| 7 | MB4 | 923(ACT4) |
| 8 | MB7 | 911(ACT7) |

MAXIMUM AVERAGE VALUE 1050.8 (ranks 1-5)

MINIMUM AVERAGE VALUE 933.3 (ranks 6-8)

OVERALL AVERAGE VALUE : 1006.75

FACTOR DETERMINATION TABLE 132

| ADJUSTMENT VALUE | 0 ~ 500 | 500 ~ 1000 | 1000 ~ 2000 | 2000 ~ |
|---|---|---|---|---|
| CORRECTION FACTOR Ct | 0.75 | 0.88 | 1.00 | 1.25 |

IMAGE CODING APPARATUS AND IMAGE CONVERSION APPARATUS

BACKGROUND OF THE INVENTION

1. Field of the Invention

The present invention relates to a technique for encoding image data on the basis of a coding system such as MPEG, H.264, or the like.

2. Description of the Background Art

Images to be delivered on digital broadcasts, those to be stored in media such as DVDs (Digital Versatile Disks) and hard disks, and the like are compressed according to various coding systems. The object for such compressions is to suppress a transmission band, increase the transmission rate, decrease the memory size, or the like.

One of the coding systems that have been conventionally adopted is MPEG2. The MPEG2 is a coding system that can be used for communication media or broadcasting media, as well as for recording in recording media. Specifically, the MPEG2 is widely used in digital broadcasts, video conferences, videophone systems, or the like.

Another coding system, other than the MPEG2, is H.264. The H.264 achieves a compression ratio twice to four times as high as that of the MPEG2. Since there are a plurality of different coding systems, coding system conversion is sometimes performed in order to reduce the amount of codes in coded image data.

A transcoder disclosed in Japanese Patent Application Laid Open Gazette No. 2008-42426 comprises a decoder for decoding image data encoded according to MPEG2 and an encoder for encoding again the decoded image data according to H.264. The encoder calculates a macroblock evaluation value and an average macroblock evaluation value from the decode image data. The macroblock evaluation value is an evaluation value indicating the degree of dispersion of pixels in a macroblock and calculated for each macroblock. The average macroblock evaluation value is an average value of the macroblock evaluation values for one frame. On the basis of the difference between the macroblock evaluation value and the average macroblock evaluation value, a quantization step value is determined for each macroblock.

The macroblock evaluation value sometimes locally varies in a frame. For example, an object macroblock to be encoded is present in an area where the proportion of macroblocks each having a small macroblock evaluation value is high. If the macroblock evaluation value of the object macroblock is larger than macroblock evaluation values of surrounding macroblocks, the object macroblock is quantized more coarsely than the surrounding macroblocks. As a result, the subjective image quality of the recoded image data decreases.

The object macroblock is sometimes present in an area where the proportion of macroblocks each having a large macroblock evaluation value is high. In this case, if the macroblock evaluation value of the object macroblock is smaller than macroblock evaluation values of surrounding macroblocks, the object macroblock is quantized more finely than the surrounding macroblocks. When the object macroblock is quantized finely, the amount of codes in the recoded image data increases but this does not contribute so much to an improvement of the subjective image quality of the recoded image data.

SUMMARY OF THE INVENTION

The present invention is intended for an image coding apparatus. According to a preferred embodiment of the present invention, the image coding apparatus comprises an evaluation value calculation part for dividing inputted uncompressed image data into a plurality of macroblocks and calculating an activity indicating the degree of dispersion of pixel values in each macroblock, a statistical value calculation part for specifying a plurality of surrounding macroblocks positioned around an object macroblock of which a quantization step value is to be determined and calculating a statistical value of a plurality of surrounding activities corresponding to the plurality of surrounding macroblocks, respectively, a correction factor determination part for comparing the statistical value with an activity of the object macroblock to determine a correction factor corresponding to the object macroblock on the basis of a comparison result, and a quantization step value determination part for correcting a reference quantization step value allocated to the object macroblock on the basis of the correction factor to determine a quantization step value to be used for quantizing the object macroblock.

Since the quantization step value of the object macroblock to be encoded is determined in accordance with a distribution of activities of the surrounding macroblocks, it is possible to suppress local variation of the quantization step values.

Preferably, the correction factor determination part includes an activity adjustment part for generating an adjustment value obtained by adjusting the activity of the object macroblock on the basis of the comparison result, and a factor determination table indicating a correspondence between a predetermined adjustment value and a correction factor, and in the image coding apparatus, the correction factor is determined on the basis of the generated adjustment value and the factor determination table.

By the image coding apparatus of the present invention, it is possible to easily determine the quantization step value on the basis of the adjustment value of the activity of the object macroblock.

Therefore, it is an object of the present invention to provide a technique for suppressing degradation of image quality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view used for explanation of a first method for calculating a maximum average value and a minimum average value;

FIG. 5 is a view used for explanation of a second method for calculating a maximum average value and a minimum average value;

DESCRIPTION OF THE PREFERRED EMBODIMENTS

Hereinafter, with reference to figures, the preferred embodiments of the present invention will be discussed.

[The First Preferred Embodiment]

{1. Constitution of Image Coding Apparatus 1}

Figure 1:
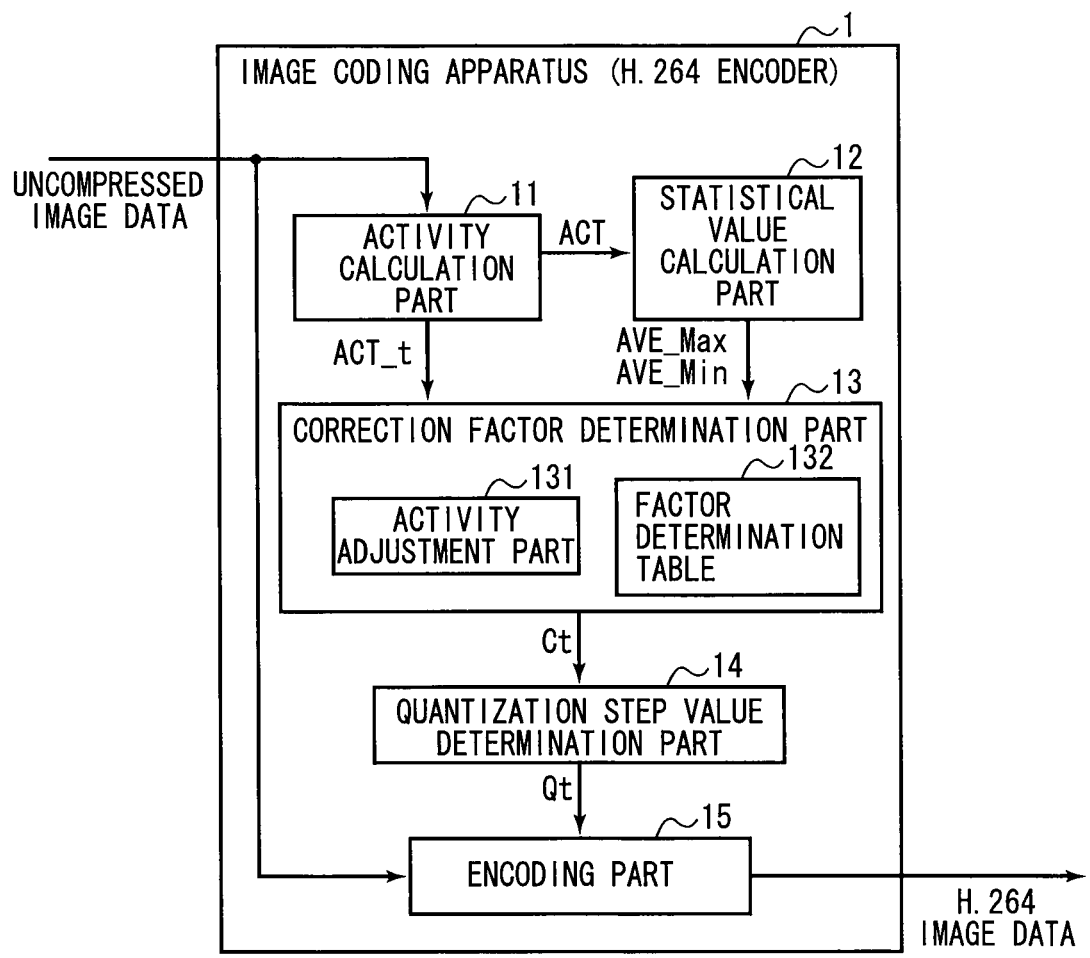
FIG. 1 is a block diagram showing a functional constitution of an image coding apparatus in accordance with a first preferred embodiment of the present invention.

FIG. 1 is a block diagram showing a functional constitution of an image coding apparatus 1 in accordance with the first preferred embodiment of the present invention. As shown in FIG. 1, the image coding apparatus 1 encodes inputted uncompressed image data according to the H.264 system and outputs H.264 image data. The image coding apparatus 1 comprises an activity calculation part 11, a statistical value calculation part 12, a correction factor determination part 13, a quantization step value determination part 14, and an encoding part 15.

The activity calculation part 11 divides the uncompressed image data into a plurality of macroblocks and calculates an activity ACT for each macroblock. The activity ACT is a numerical value indicating the degree of dispersion of pixels in the macroblock.

The statistical value calculation part 12 specifies a plurality of surrounding macroblocks positioned around an object macroblock of which a quantization step value is to be determined. The object macroblock is determined on the basis of a predetermined coding order of the macroblocks, or the like. The statistical value calculation part 12 calculates a statistical value of a plurality of surrounding activities corresponding to the plurality of surrounding macroblocks, respectively. The statistical value is a value indicating a distribution of the plurality of surrounding activities. The statistical value includes a maximum average value AVE_Max and a minimum average value AVE_Min described later.

The correction factor determination part 13 compares the statistical value with an activity ACT_t of the object macroblock to determine a correction factor Ct corresponding to the object macroblock on the basis of the comparison result.

The correction factor determination part 13 includes an activity adjustment part 131 and a factor determination table 132. The activity adjustment part 131 determines an adjustment value of the object macroblock on the basis of the comparison result. The adjustment value is a value obtained by adjusting the activity ACT_t in accordance with the distribution of the surrounding activities. The factor determination table 132 is a table defining a correspondence between the adjustment value and the correction factor Ct. The correction factor Ct is determined on the basis of the determined adjustment value and the factor determination table 132.

The quantization step value determination part 14 corrects a reference quantization step value allocated to the object macroblock on the basis of the correction factor Ct to calculate a quantization step value Qt to be used for quantization of the object macroblock. The reference quantization step value is determined on the basis of the target amount of codes of the H.264 image data, which is preset in the image coding apparatus 1.

The encoding part 15 orthogonally transforms the uncompressed image data to generate data having a frequency component of each macroblock. The encoding part 15 quantizes the data having the frequency component with a quantization step value corresponding to each macroblock to generate H.264 image data.

The image coding apparatus 1 determines the quantization step value Qt of the object macroblock on the basis of the distribution of the surrounding activities. This suppresses local variation of the quantization step values in the H.264 image data, and therefore degradation of the subjective image quality of the H.264 image data is suppressed and the coding efficiency is improved.

{2. Operation Flow for Determining Quantization Step Value Qt}

Figure 2:
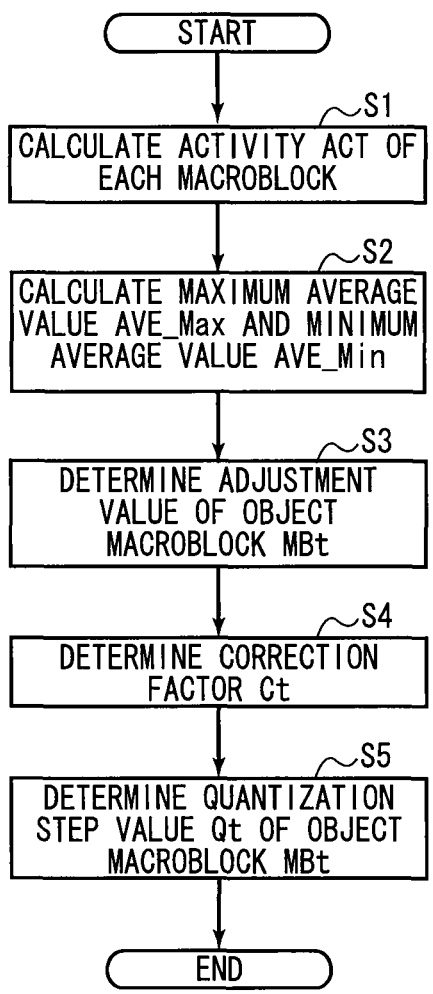
FIG. 2 is a flowchart showing an operation flow for determining a quantization step value.

FIG. 2 is a flowchart showing an operation flow for determining the quantization step value Qt of the object macroblock.

{2. 1. Calculation of Activity}

First, the activity calculation part 11 divides the uncompressed image data inputted to the image coding apparatus 1 into a plurality of macroblocks and calculates an activity ACT for each macroblock (Step S1).

Herein, the activity ACT will be described in detail. As described above, the activity ACT is an evaluation value indicating the degree of dispersion of pixels in a macroblock. The activity ACT is a sum of absolute differences (SAD) of an average pixel value in a macroblock and a pixel value of each pixel in the macroblock. The activity ACT is the same as an activity value used in the code amount control model of MPEG2, or the like.

If an image of a macroblock is a flat image, the activity ACT is small. On the other hand, if an image of a macroblock has great variations, the activity ACT is large. In other words, a macroblock having a large activity ACT is one of an image with great variations, and a macroblock having a small activity ACT is one of a flat image.

Calculation of the activity ACT may be performed by using luminance values of pixels in the macroblock. Specifically, the activity ACT can be obtained by calculating a sum of absolute differences of an average luminance value of the pixels in the macroblock and a luminance value of each of the pixels in the macroblock. If the uncompressed image data is image data in the YCbCr space, for example, the activity ACT can be calculated by using a pixel value of the Y component of each pixel. A pixel value of any component other than the luminance component, however, may be used. In a case of image data in the RGB space, for example, the activity ACT may be calculated by using a pixel value of the G component, or by using a pixel value of any other component.

{2. 2. Calculation of Statistical Value}

Next, the statistical value calculation part 12 specifies the object macroblock and the surrounding macroblocks and calculates a maximum average value AVE_Max and a minimum average value AVE_Min as a statistical value of the surrounding macroblocks (Step S2).

Figure 3:
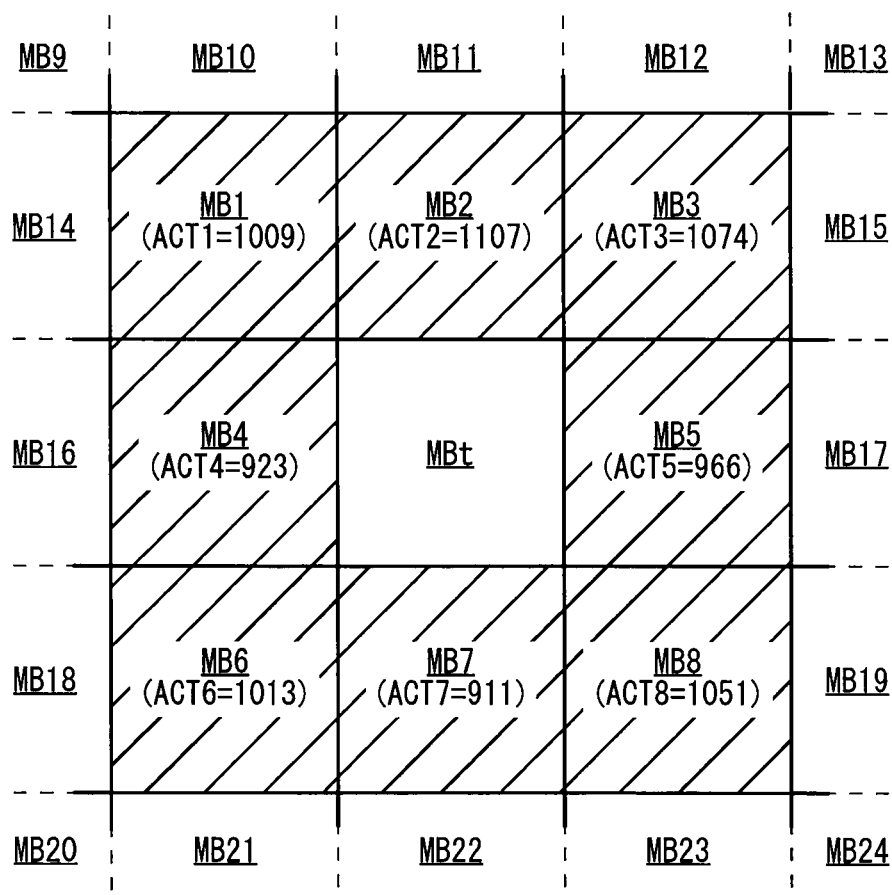
FIG. 3 is a view showing a positional relation between an object macroblock and surrounding macroblocks.

FIG. 3 is a view showing a positional relation between the object macroblock and the surrounding macroblocks. As shown in FIG. 3, eight macroblocks positioned around an object macroblock MBt are specified as surrounding macroblocks MB1 to MB8. Twenty-four macroblocks position around the object macroblock MBt, however, may be specified as surrounding macroblocks MB1 to MB24.

The maximum average value AVE_Max and the minimum average value AVE_Min are calculated by any one of two methods discussed below.

(Calculation of Maximum Average Value and Minimum Average Value (the First Method))

FIG. 4 is a view used for explanation of a first method for calculating the maximum average value AVE_Max and the minimum average value AVE_Min. Values of surrounding activities ACT1 to ACT8 shown in FIG. 4 correspond to the values of the surrounding activities ACT1 to ACT8 shown in FIG. 3. In FIG. 4, the macroblocks are ranked in descending order of the values of the surrounding activities ACT1 to ACT8.

In order to obtain the maximum average value AVE_Max, the statistical value calculation part 12 extracts the upper-ranked four surrounding activities out of the surrounding activities ACT1 to ACT8. Specifically, extracted are the surrounding activities each having a value equal to or larger than a median of the activities ACT1 to ACT8. The statistical value calculation part 12 averages the extracted four surrounding activities to obtain the maximum average value AVE_Max. As shown in FIG. 4, the values of the upper-ranked four surrounding activities ACT2, ACT3, ACT8, and ACT6 are 1107, 1074, 1051, and 1013, respectively. Therefore, the maximum average value AVE_Max calculated by the first method is 1061.25.

In order to obtain the minimum average value AVE_Min, the statistical value calculation part 12 extracts the lower-ranked four surrounding activities in the value of the surrounding activity ACT. Specifically, extracted are the surrounding activities each having a value equal to or smaller than the median of the activities ACT1 to ACT8. The statistical value calculation part 12 averages the extracted four lower-ranked surrounding activities to obtain the minimum average value AVE_Min. As shown in FIG. 4, the values of the lower-ranked four surrounding activities ACT1, ACT5, ACT4, and ACT7 are 1009, 966, 923, and 911, respectively. Therefore, the minimum average value AVE_Min calculated by the first method is 952.25.

(Calculation of Maximum Average Value and Minimum Average Value (the Second Method))

FIG. 5 is a view used for explanation of a second method for calculating the maximum average value AVE_Max and the minimum average value AVE_Min. The statistical value calculation part 12 calculates an overall average value by averaging the surrounding activities ACT1 to ACT8. As shown in FIG. 5, the overall average value is 1006.75.

In order to obtain the maximum average value AVE_Max, the statistical value calculation part 12 extracts surrounding activities each having a value larger than the overall average value. The statistical value calculation part 12 averages the extracted surrounding activities to obtain the maximum average value AVE_Max. As shown in FIG. 5, the values of the surrounding activities ACT2, ACT3, ACT8, ACT6, and ACT1 are each larger than the overall average value. Therefore, the maximum average value AVE_Max calculated by the second method is 1050.8.

In order to obtain the minimum average value AVE_Min, the statistical value calculation part 12 extracts surrounding activities each having a value smaller than the overall average value. The statistical value calculation part 12 averages the extracted surrounding activities to obtain the minimum average value AVE_Min. As shown in FIG. 5, the values of the surrounding activities ACT5, ACT4, and ACT7 are each smaller than the overall average value. Therefore, the minimum average value AVE_Min calculated by the second method is 933.3.

Thus, the maximum average value AVE_Max and the minimum average value AVE_Min are calculated. The image coding apparatus 1 may determine which of the two methods, first or second, should be used to calculate the maximum average value AVE_Max and the minimum average value AVE_Min.

The statistical value calculation part 12 may specify some of the macroblocks which are adjacent to the object macroblock MBt, as the surrounding macroblocks. When the number of surrounding macroblocks is an odd number and the first method is used to calculate the maximum average value AVE_Max and the minimum average value AVE_Min, there is a surrounding activity having the median. In this case, the surrounding activity having the median may be included in both the upper-ranked group and the lower-ranked group or may not be included.

{2. 3. Determination of Adjustment Value}

Referring back to FIG. 2, the activity calculation part 11 inputs the activity ACT_t of the object macroblock MBt to the correction factor determination part 13. The statistical value calculation part 12 inputs the maximum average value AVE_Max and the minimum average value AVE_Min to the correction factor determination part 13. The activity adjustment part 131 determines an adjustment value of the object macroblock MBt by using the activity ACT_t, the maximum average value AVE_Max, and the minimum average value AVE_Min (Step S3). The adjustment value is a parameter for determining the quantization step value Qt of the object macroblock MBt. As the adjustment value increases, the quantization step value Qt becomes coarser (larger). Detailed discussion will be made later on determination of the quantization step value Qt.

Figures 6, 7:
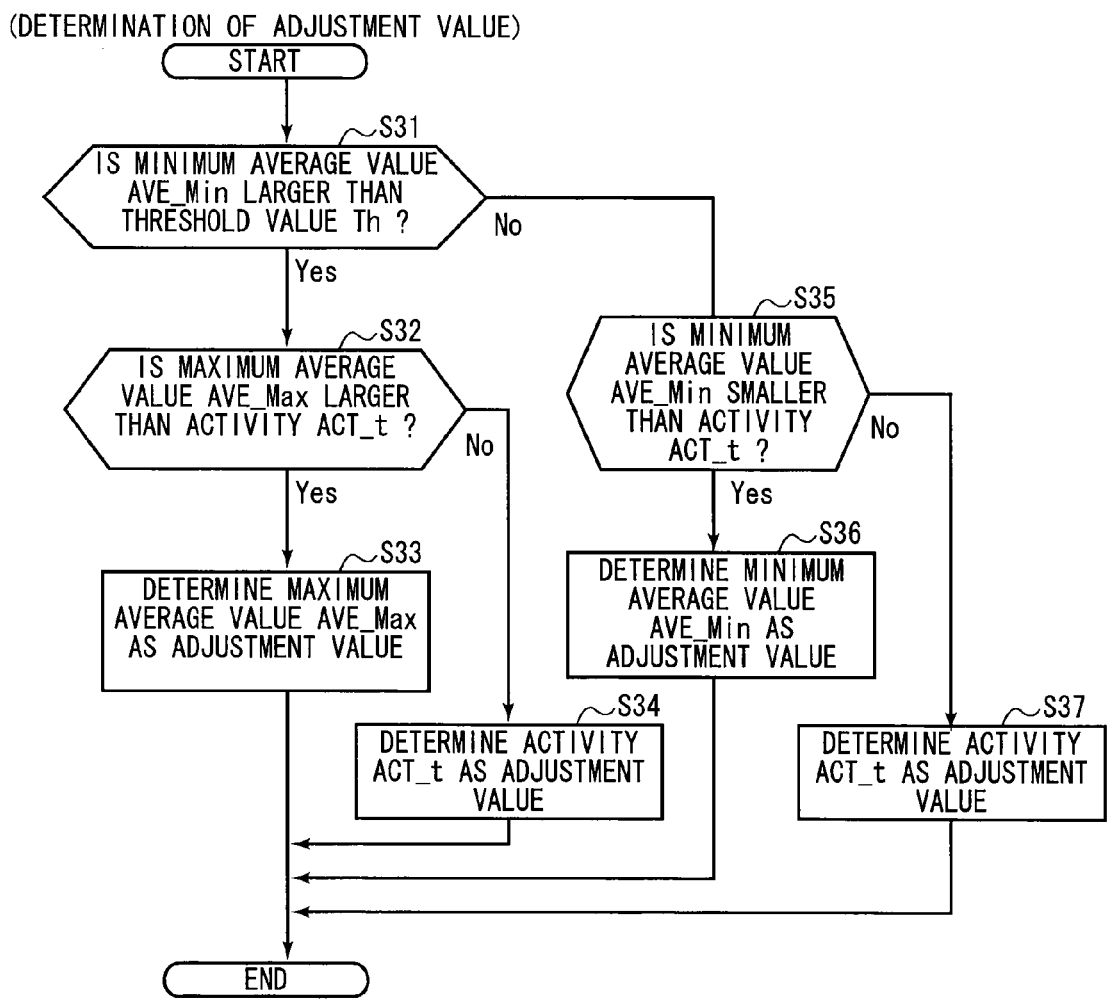
FIG. 6 is a flowchart showing an operation flow for determining an adjustment value of the object macroblock.
FIG. 7 is a view showing a factor determination table.

Herein, detailed discussion will be made on determination of the adjustment value of the object macroblock MBt with reference to FIG. 6. FIG. 6 is a flowchart showing an operation flow for determining the adjustment value.

As shown in FIG. 6, the activity adjustment part 131 compares the minimum average value AVE_Min with a predetermined threshold value Th (Step S31).

When the minimum average value AVE_Min is larger than the threshold value Th ("Yes" in Step S31), the activity adjustment part 131 determines that the proportion of macroblocks having images with great variations in the surrounding macroblocks MB1 to MB8 is high. Therefore, the adjustment value is set to be larger in order to set the quantization step value Qt to be coarse. Specifically, the activity adjustment part 131 compares the maximum average value AVE_Max with the activity ACT_t (Step S32).

When the maximum average value AVE_Max is larger than the activity ACT_t ("Yes" in Step S32), the activity adjustment part 131 determines to use the maximum average value AVE_Max as the adjustment value (Step S33). It is determined that the object macroblock MBt has a relatively flat image in an area where the proportion of macroblocks having images with great variations is high. Since the subjective image quality of the H.264 image data is not degraded even if the object macroblock MBt is quantized coarsely, the maximum average value AVE_Max larger than the activity ACT_t is used as the adjustment value. It is thereby possible to improve the coding efficiency without degrading the subjective image quality of the H.264 image data.

On the other hand, when the activity ACT_t is larger than the maximum average value AVE_Max ("No" in Step S32), the activity adjustment part 131 determines to use the activity ACT_t as the adjustment value (Step S34). Since the object macroblock MBt has an image with great variations, like the surrounding macroblocks MB1 to MB8, it is not necessary to finely quantize the object macroblock MBt. By using the activity ACT_t as the adjustment value, it is possible to quantize the object macroblock MBt while maintaining the characteristics of the object macroblock MBt.

Discussion returns to Step S31. When the minimum average value AVE_Min is smaller than the threshold value Th ("No" in Step S31), the activity adjustment part 131 determines that the proportion of macroblocks having flat images in the surrounding macroblocks MB1 to MB8 is high. Therefore, the adjustment value is set to be smaller in order to set the quantization step value Qt to be fine. Specifically, the activity adjustment part 131 compares the minimum average value AVE_Min with the activity ACT_t (Step S35).

When the minimum average value AVE_Min is smaller than the activity ACT_t ("Yes" in Step S35), the activity adjustment part 131 determines to use the minimum average value AVE_Min as the adjustment value (Step S36). In this case, it is determined that the object macroblock MBt has an image with relatively great variations in an area where the proportion of macroblocks having flat images is high. If the object macroblock MBt is quantized more coarsely than the surrounding macroblocks MB1 to MB8, there is a possibility of degrading the subjective image quality. Therefore, the minimum average value AVE_Min smaller than activity ACT_t is used as the adjustment value. The object macroblock MBt is quantized finely, like the surrounding macroblocks MB1 to MB8.

On the other hand, when the activity ACT_t is smaller than the minimum average value AVE_Min ("No" in Step S35), the activity adjustment part 131 determines to use the activity ACT_t as the adjustment value (Step S37). Since the object macroblock MBt has a flat image, like the surrounding macroblocks MB1 to MB8, it is not necessary to coarsely quantize the object macroblock MBt. By using the activity ACT_t as the adjustment value, it is possible to quantize the object macroblock MBt while maintaining the characteristics of the object macroblock MBt. Thus, the adjustment value is determined by comparing the activity ACT_t with the maximum average value AVE_Max or the minimum average value AVE_Min. In other words, the adjustment value is a value obtained by resetting the activity ACT_t, with the distribution of the surrounding activities ACT1 to ACT8 taken into consideration.

{2. 4. Determination Of Correction Factor}

Referring back to FIG. 2, after the adjustment value is determined in Step S3, the correction factor determination part 13 determines a correction factor Ct of the object macroblock MBt on the basis of the adjustment value and the factor determination table 132 (Step S4). The correction factor Ct is a parameter for determining the quantization step value Qt of the object macroblock MBt.

FIG. 7 is a view showing the factor determination table 132. As shown in FIG. 7, the factor determination table 132 is a table showing the correspondence between the adjustment value and the correction factor Ct. In the factor determination table 132, as the adjustment value decreases, the correction factor Ct is set to be smaller. When the adjustment value is 967, for example, the correction factor Ct is determined to be 0.88. When the adjustment value is 2147, the correction factor Ct is determined to be 1.25.

In the factor determination table 132, the range of the adjustment value and the correction factor Ct can be set arbitrarily. When the uncompressed image data is an image of a landscape with less motion, for example, the value of the correction factor Ct can be set to be smaller in order to quantize each macroblock finely.

In the first preferred embodiment, the correction factor determination part 13 has one factor determination table 132. The correction factor determination part 13, however, may have a plurality of factor determination tables 132. For example, the correction factor determination part 13 may have a plurality of factor determination tables 132 corresponding to types (I picture, P picture, B picture, and the like) of frames of compressed image data.

{2. 5. Calculation of Quantization Step Value Qt}

Referring back to FIG. 2, after the correction factor Ct of the object macroblock MBt is determined in Step S4, the correction factor determination part 13 inputs the determined correction factor Ct to the quantization step value determination part 14. The quantization step value determination part 14 determines a quantization step value Qt by multiplying the reference quantization step value allocated to the object macroblock MBt by the correction factor Ct (Step S5). The reference quantization step value is determined, for example, on the basis of a target bit rate of the H.264 image data, which is preset in the image coding apparatus 1. From the fact that the quantization step value Qt is obtained by multiplying the reference quantization step value by the correction factor Ct, it can be seen that the quantization step value Qt becomes smaller as the adjustment value decreases.

The quantization step value determination part 14 inputs the quantization step value Qt to the encoding part 15. The encoding part 15 quantizes the date having the frequency component, which is obtained by orthogonally transforming the object macroblock MBt, by using the quantization step value Qt, to thereby encode the object macroblock MBt.

Thus, the quantization step value Qt of the object macroblock MBt is determined with the distribution of the surrounding activities ACT1 to ACT8 taken into consideration. As a result, it is possible to improve the image quality of the H.264 image data and the coding efficiency.

Specifically, when it is determined that the images are flat in the surrounding macroblocks MB1 to MB8, even if the image of the object macroblock MBt has great variations, the object macroblock MBt is quantized as finely as the surrounding macroblocks MB1 to MB8. Since the object macroblock MBt is not quantized coarsely in the area where the images are flat, it is possible to improve the subjective image quality of the H.264 image data.

When it is determined that the images have great variations in the surrounding macroblocks MB1 to MB8, even if the image of the object macroblock MBt is flat, the object macroblock MBt is quantized as coarsely as the surrounding macroblocks MB1 to MB8. Since the object macroblock MBt is not quantized finely in the area where the images have great variations, it is possible to suppress unnecessary bit allocation and improve the coding efficiency.

[The Second Preferred Embodiment]

Figure 8:
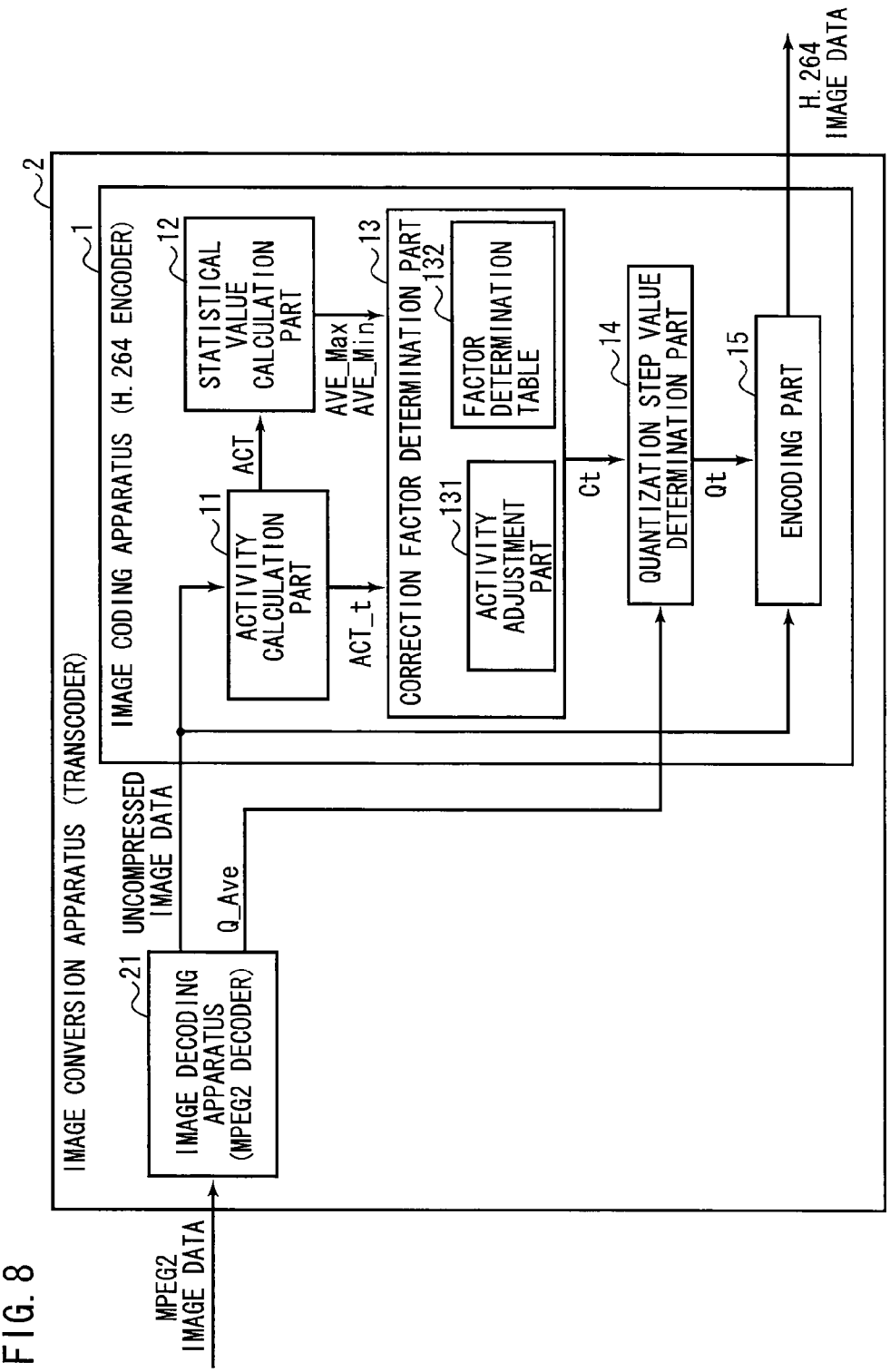
FIG. 8 is a block diagram showing a functional constitution of an image conversion apparatus in accordance with a second preferred embodiment of the present invention.

FIG. 8 is a block diagram showing a functional constitution of an image conversion apparatus 2 in accordance with the second preferred embodiment of the present invention. The image conversion apparatus 2 comprises an image decoding apparatus 21 and the image coding apparatus 1. The image coding apparatus 1 is the apparatus described in the above first preferred embodiment.

The image decoding apparatus 21 is an MPEG2 decoder. The image decoding apparatus 21 decodes MPEG2 image data encoded according to the MPEG2 system to generate uncompressed image data. The uncompressed image data is inputted to the image coding apparatus 1.

The image coding apparatus 1 recodes the uncompressed image data according to the H.264 system in the same procedure as discussed in the above first preferred embodiment. In the image coding apparatus 1, however, the quantization step value determination part 14 uses an average quantization step value Q_Ave acquired from the image decoding apparatus 21, as the reference quantization step value.

The average quantization step value Q_Ave is a value obtained by averaging the quantization step values of all the macroblocks in one frame of the MPEG2 image data. The image decoding apparatus 21 generates the average quantization step value Q_Ave while decoding the MPEG2 image data. By using the average quantization step value Q_Ave as the reference quantization step value, it is possible to convert the MPEG2 image data into the H.264 image data without largely degrading the image quality.

The quantization step value determination part 14 obtains the quantization step value Qt of the object macroblock MBt by multiplying the average quantization step value Q_Ave by the correction factor Ct of the object macroblock MBt.

In the second preferred embodiment, a value determined from the target bit rate of the H.264 image data may be used as the reference quantization step value, like in the first preferred embodiment. It is thereby possible to reduce the amount of codes of the H.264 image data into which the MPEG2 image data is converted, to the target rate.

As the image conversion apparatus 2, shown is a transcoder for converting the MPEG2 image data into the H.264 image data in FIG. 8. The image conversion apparatus 2, however, may be a transcoder for converting inputted H.264 image data into H.264 image data again.

While the invention has been shown and described in detail, the foregoing description is in all aspects illustrative and not restrictive. It is therefore understood that numerous modifications and variations can be devised without departing from the scope of the invention.

What is claimed is:

1. An image coding apparatus, comprising:
an evaluation value calculation part for dividing inputted uncompressed image data into a plurality of macroblocks and calculating an activity indicating the degree of dispersion of pixel values in each macroblock;
a statistical value calculation part for specifying a plurality of surrounding macroblocks positioned around an object macroblock of which a quantization step value is to be determined and calculating a first statistical value of a plurality of surrounding activities corresponding to said plurality of surrounding macroblocks, respectively;
an activity adjustment part for decreasing an activity of the object macroblock when the first statistical value is smaller than a predetermined threshold and said activity of said object macroblock is larger than the first statistical value;
a correction factor determination part for determining a correction factor depending on said activity of said object macroblock based on a lookup table that specifies a distinct correction factor for each of a plurality of non-overlapping, predetermined ranges of adjustment values, which are based on said activity of said object macroblock; and
a quantization step value determination part for correcting a reference quantization step value allocated to said object macroblock on the basis of said correction factor to determine a quantization step value to be used for quantizing said object macroblock.

2. The image coding apparatus according to claim 1, wherein the statistical value calculation part calculates a second statistical value of the plurality of surrounding activities, the second statistical value being larger than the first statistical value, and
said activity adjustment part increases said activity of said object macroblock when the first statistical value is larger than the predetermined threshold and said activity of said object macroblock is smaller than the second statistical value.

3. The image coding apparatus according to claim 2, wherein said second statistical value is obtained by calculating an average value of said plurality of surrounding activities and averaging one or more surrounding activities which are larger than said average value, out of said plurality of surrounding activities, and the first statistical value is obtained by averaging one or more surrounding activities which are smaller than said average value, out of said plurality of surrounding activities.

4. The image coding apparatus according to claim 3, wherein said activity adjustment part determines the first statistical value as said activity of said object macroblock when the first statistical value is smaller than the predetermined threshold and said activity of said object macroblock is larger than the first statistical value.

5. The image coding apparatus according to claim 4, wherein said activity adjustment part maintains said activity of said object macroblock when the first statistical value is larger than said activity of said object macroblock.

6. The image coding apparatus according to claim 4, wherein said activity adjustment part determines the second statistical value as said activity of said object macroblock when the first statistical value is larger than the predetermined threshold and said activity of said object macroblock is smaller than the second statistical value.

7. The image coding apparatus according to claim 6, wherein said activity adjustment part maintains said activity of said object macroblock when the second statistical value is smaller than said activity of said object macroblock.

8. The image coding apparatus according to claim 2, wherein said second statistical value is obtained by averaging one or more surrounding activities each of which has a value not smaller than a median of said plurality of surrounding activities, out of said plurality of surrounding activities, and the first statistical value is obtained by averaging one or more surrounding activities each of which has a value not larger than said median of said plurality of surrounding activities, out of said plurality of surrounding activities.

9. The image coding apparatus according to claim 8, wherein said activity adjustment part determines the first statistical value as said activity of said object macroblock when the first statistical value is smaller than the predetermined threshold and said activity of said object macroblock is larger than the first statistical value.

10. The image coding apparatus according to claim 9, wherein said activity adjustment part maintains said activity of said object macroblock when the first statistical value is larger than said activity of said object macroblock.

11. The image coding apparatus according to claim 10, wherein said activity adjustment part determines the second statistical value as said activity of said object macroblock when the first statistical value is larger than the predetermined threshold and said activity of said object macroblock is smaller than the second statistical value.

12. The image coding apparatus according to claim 11, wherein said activity adjustment part maintains said activity of said object macroblock when the second statistical value is smaller than said activity of said object macroblock.

13. An image conversion apparatus, comprising:
an image decoding circuit configured to decode coded image data to generate uncompressed image data; and
an image coding circuit configured to encode said uncompressed image data, wherein said image coding circuit comprises
an evaluation value calculation part for dividing said inputted uncompressed image data into a plurality of macroblocks and calculating an activity indicating the degree of dispersion of pixel values in each macroblock;
a statistical value calculation part for specifying a plurality of surrounding macroblocks positioned around an object macroblock of which a quantization step value is to be determined and calculating a first statistical value of a plurality of surrounding activities corresponding to said plurality of surrounding macroblocks, respectively;
an activity adjustment part for decreasing an activity of the object macroblock when the first statistical value is smaller than a predetermined threshold and said activity of said object macroblock is larger than the first statistical value;

a correction factor determination part for determining a correction factor depending on said activity of said object macroblock based on a lookup table that specifies a distinct correction factor for each of a plurality of non-overlapping, predetermined ranges of adjustment values, which are based on said activity of said object macroblock; and a quantization step value determination part for correcting a reference quantization step value allocated to said object macroblock on the basis of said correction factor to determine a quantization step value to be used for quantizing said object macroblock.

* * * * *